US012617601B2

(12) United States Patent
Petersen et al.

(10) Patent No.: US 12,617,601 B2
(45) Date of Patent: May 5, 2026

(54) DISPENSER FOR A CONTINUOUS STRIP OF A SUBSTRATE SUPPORTING BEND-SENSITIVE ITEMS

(71) Applicant: CommScope Technologies LLC, Hickory, NC (US)

(72) Inventors: Cyle D. Petersen, Belle Plaine, MN (US); John T. Pfarr, Le Sueur, MN (US); Michael J. Schomisch, Rosemount, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 352 days.

(21) Appl. No.: 18/248,347

(22) PCT Filed: Oct. 5, 2021

(86) PCT No.: PCT/US2021/053550
§ 371 (c)(1),
(2) Date: Apr. 7, 2023

(87) PCT Pub. No.: WO2022/076396
PCT Pub. Date: Apr. 14, 2022

(65) Prior Publication Data
US 2023/0365320 A1 Nov. 16, 2023

Related U.S. Application Data

(60) Provisional application No. 63/088,601, filed on Oct. 7, 2020.

(51) Int. Cl.
B65D 83/08 (2006.01)
B65D 75/42 (2006.01)
(Continued)

(52) U.S. Cl.
CPC .......... B65D 83/0811 (2013.01); B65D 75/42 (2013.01); B65D 75/527 (2013.01);
(Continued)

(58) Field of Classification Search
CPC ........... B65H 2404/10; B65H 2404/11; B65H 75/16; B65H 75/02; B65H 75/025;
(Continued)

(56) References Cited

U.S. PATENT DOCUMENTS 1,208,701 A 12/1916 Trenner
2,456,068 A 12/1948 Liben
(Continued)

FOREIGN PATENT DOCUMENTS

EP 0 989 890 B1 5/2003
JP 2007153439 A * 6/2007
(Continued)

OTHER PUBLICATIONS

Extended European Search Report for Application No. 21878354.6 mailed Sep. 17, 2024.
(Continued)

Primary Examiner — Javier A Pagan
(74) Attorney, Agent, or Firm — Merchant & Gould P.C.

(57) ABSTRACT

A packaging dispenser for bend-resistant items. In some embodiments, the dispenser includes a container storing bags of cables in an alternating folded pattern. In some embodiments, a vertically floating dispensing guide guides the bags through a slot in the container. The dispensing guide is configured and arranged to limit over-bending of the items as the items are dispensed through the slot and to stabilize the folded pattern.

20 Claims, 9 Drawing Sheets

(51) Int. Cl.

| | |
|---|---|
| *B65D 75/52* | (2006.01) |
| *B65D 85/04* | (2006.01) |
| *B65H 75/16* | (2006.01) |
| *G02B 6/44* | (2006.01) |

(52) U.S. Cl.
CPC ......... *B65D 83/0894* (2013.01); *B65D 85/04* (2013.01); *B65H 75/16* (2013.01); *B65H 2404/10* (2013.01); *B65H 2701/32* (2013.01); *G02B 6/4446* (2013.01)

(58) Field of Classification Search
CPC .... B65H 75/04; B65H 75/08; B65H 2701/32; B65D 83/0811; B65D 83/0805; B65D 83/0835; B65D 83/0841; B65D 83/8308; B65D 83/0894; B65D 75/40; B65D 75/42; B65D 75/527; B65D 85/00; B65D 85/02; B65D 85/04
See application file for complete search history.

(56) References Cited

U.S. PATENT DOCUMENTS

| | | | |
|---|---|---|---|
| 2,587,928 | A | 3/1952 | Tuck et al. |
| 2,758,710 | A | 8/1956 | Arens |
| 4,009,682 | A | 3/1977 | Patel et al. |
| 4,638,921 | A | 1/1987 | Sigl et al. |
| 8,758,046 | B2 | 6/2014 | Pezzetti et al. |
| 9,601,880 | B2 | 3/2017 | Rynaski et al. |
| 10,322,868 | B2 | 6/2019 | Cupples et al. |
| 10,759,616 | B2 | 9/2020 | Tran |
| 2008/0264964 | A1* | 10/2008 | Kaiser ............... B65D 83/0805 221/26 |
| 2014/0263814 | A1* | 9/2014 | Cupples ................ B65D 85/04 242/588.3 |

FOREIGN PATENT DOCUMENTS

| | | | |
|---|---|---|---|
| JP | 2011-63292 A | | 3/2011 |
| JP | 2011063292 A | * | 3/2011 |

OTHER PUBLICATIONS

International Search Report and Written Opinion for Application No. PCT/US2021/053550 mailed Jan. 26, 2022.
EZ Patch Brochure, Legrand, 6 pages (Downloaded as of Sep. 2, 2020).
LAN-1959-AEN, Corning Optical Communications LLC, 2 pages (Nov. 2015).

* cited by examiner

86

70

72

84

72

D6

70

82

72   D5

78

100

DISPENSER FOR A CONTINUOUS STRIP OF A SUBSTRATE SUPPORTING BEND-SENSITIVE ITEMS

CROSS-REFERENCE TO RELATED APPLICATION

This application is a National Stage Application of PCT/US2021/053550, filed on Oct. 5, 2021, which claims the benefit of U.S. Patent Application Ser. No. 63/088,601, filed on Oct. 7, 2020, the disclosures of which are incorporated herein by reference in their entireties. To the extent appropriate, a claim of priority is made to each of the above disclosed applications.

TECHNICAL FIELD

The present disclosure relates to packaging and dispensing of optical fiber cables and other bendable items.

BACKGROUND

Fiber optic cables carry optical fibers that transmit optical signals to and from telecommunications equipment. Optical cables can be packaged in bulk and shipped to a given installation site. The optical fibers are sensitive to bending. Bending an optical fiber beyond its minimum bend radius can permanently damage the optical fiber. In addition, the jackets of fiber optic cables can have bend or kink memory. For example, an optical cable that has been packaged for an extended period of time in a bent configuration may disadvantageously retain bends or kinks for a period of time or permanently even after the optical cable has been removed from the packaging.

SUMMARY

In general terms, the present disclosure is directed to improved packaging for bend-sensitive items, such as, but no limited to, hoses, straps, wires, electrical cables and fiber optic cables.

Such fiber optic cables can include, e.g., jumper cables or patch cords, which can have one or more connectorized ends that terminate a fiber at a connector. The connector can be installed in telecommunications equipment to provide an optical connection or for storage for the connector until an optical connection is desired.

Dispensers according to the present disclosure can, advantageously, inhibit or minimize undesirable bend or kink retention of packaged optical fiber cables.

Dispensers according to the present disclosure can, advantageously, prevent packaged fiber optic cables from bending beyond their minimum bend radii in a packaged configuration and/or while being dispensed from a container.

Dispensers according to the present disclosure can, advantageously, minimize a quantity of packing material needed to safely store and transport a container of fiber optic cables that includes the dispenser.

Dispensers according to the present disclosure can, advantageously, simplify manufacturing and assembly of cable packaging, reduce the weight of the overall packaging, reduce the amount of protective shipping packaging required, and/or reduce the number of different types of materials needed for the packaging.

According to aspects of the present disclosure, there is provided a packaging container for fiber optic cables supported by holders defined by a continuous strip of a substrate that is folded in an alternating pattern such that the cables are in a stacked, substantially lie-flat configuration. A dispensing mechanism is provided for dispensing the cables through a slot of the container by pulling the strip over a vertically floating guide positioned within the container. By "vertically floating" it is meant that the guide is not attached to any structure that inhibits vertical movement of the guide within the container. As items are dispensed, the dispensing guide moves downward under the force of gravity so that the dispensing guide continues to rest on the stack, which can advantageously stabilize the alternating fold pattern of the stack.

According to certain aspects of the present disclosure, a dispenser comprises: a continuous strip of a substrate defining holders each supporting a bend-sensitive item with adjacent holders of the holders adjoining each other at fold lines; a container extending vertically from a horizontal bottom panel of the container to a horizontal top panel of the container and including a plurality of vertical side panels extending from the bottom panel to the top panel, the bottom panel and the side panels defining a storage volume, the container containing the strip in a vertical stack of the holders in the storage volume, the holders in the vertical stack being folded at the fold lines in an alternating folding pattern, one of the side panels defining a covered or uncovered horizontally facing slot; and a dispensing guide having a curved outer surface and being positioned within the storage volume vertically below a top of a slot and vertically above at least all but one of the stack of holders, the dispensing guide defining a longitudinal axis of the dispensing guide that is substantially parallel to an elongate dimension of the slot, the dispensing guide being arranged to move downward in the storage volume under a gravity force as the holders are dispensed through the slot.

According to further aspects of the present disclosure, a dispenser comprises: a continuous strip of bags each containing a bend-sensitive fiber optic cable with adjacent bags of the bags adjoining each other at perforated fold lines; a container extending vertically from a horizontal bottom panel of the container to a horizontal top panel of the container and including a plurality of vertical side panels extending from the bottom panel to the top panel, the bottom panel and the side panels defining a storage volume, the container containing the strip of bags in a vertical stack of the bags within the storage volume, the bags in the vertical stack being folded at the fold lines in an alternating folding pattern, one of the side panels defining a covered or uncovered horizontally facing slot; and a rotatable body positioned within the storage volume vertically below a top of the slot and vertically above at least all but one of the stack of bags, the rotatable body defining a rotation axis that is substantially parallel to an elongate dimension of the slot, the rotatable body being arranged to move downward in the storage volume under a gravity three as the bags are dispensed through the slot, wherein the container and the rotatable body comprise the same material; wherein the rotatable body has a radius extending from the rotation axis perpendicularly to the rotation axis to an outer surface of the rotatable body, the radius being greater than or equal to a minimum bend radius of an optical fiber of the wound fiber optic cable; wherein a maximum vertical dimension of the slot is shorter than one tenth of a maximum vertical dimension of the container; and wherein an uppermost bag in the stack is attached to the container.

According to further aspects of the present disclosure, a method comprises: folding a continuous strip of bags each containing a bend-sensitive fiber optic cable with adjacent bags of the bags adjoining each other at fold lines, the folding including folding the strip at the fold lines in an alternating folding pattern to create a vertical stack of the bags; loading the vertical stack of bags in a container having vertical and horizontal dimensions; inserting a dispensing guide in the container vertically below a top of a covered or uncovered horizontally facing slot defined by the container, the dispensing guide not being connected to the container; positioning an uppermost of the bags vertically above and abutting the dispensing guide and such that the dispensing guide is vertically above all of the other bags in the stack; attaching the uppermost of the bags to the container; and subsequent to the attaching, closing the container.

According to further aspects of the present disclosure, a method comprises: providing a container containing a rotatable body defining a rotation axis and a continuous strip of bags each containing a bend-sensitive fiber optic cable with adjacent bags of the bags adjoining each other at fold lines, the strip being folded at the fold lines in an alternating folding pattern forming a vertical stack of the bags in the container; grasping an uppermost of the bags; and pulling on the strip of bags to dispense one or more of the bags through a slot defined by the container, the pulling causing the strip of bags to drag over the rotatable body causing the strip of bags to rotate the rotatable body and further causing the rotatable body to drop vertically in the container under a gravity force.

A variety of additional aspects will be set forth in the description that follows. The aspects relate to individual features and to combinations of features. It is to be understood that both the foregoing general description and the following detailed description are exemplar and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
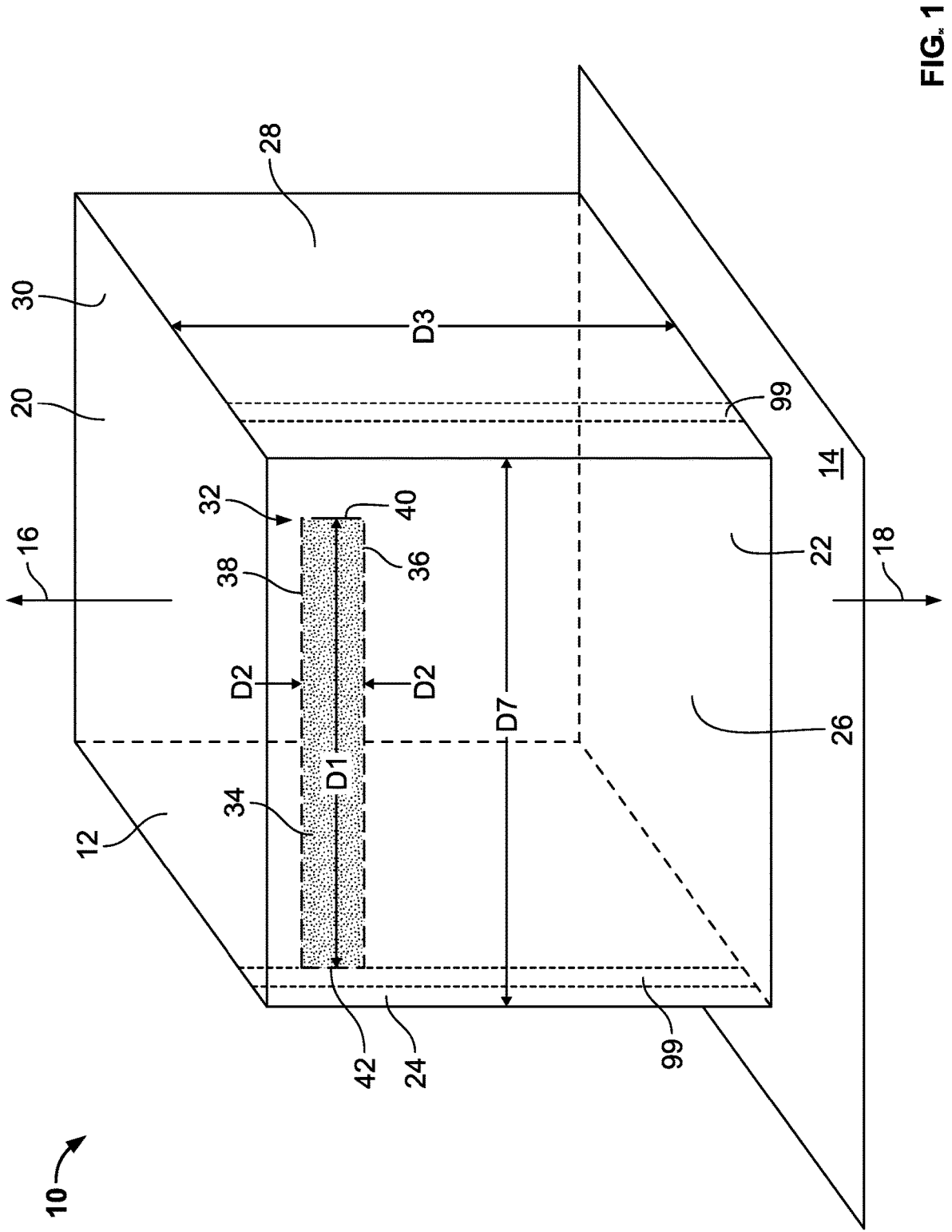
FIG. 1 is a perspective view of an example dispenser according to the present disclosure, the dispenser including a container containing bend resistant items. Some of the broken lines are provided as a visual aid to indicate edges of the container that are obscured.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Cables can be packaged for storage, shipment, and dispensing at an installation site by winding cables around a spool or reel. The spool or reel can be mounted within a container. The container is shipped to an installation site where cables can be dispensed for installation by pulling the cables off the spool or reel, causing the spool or reel to rotate. Such packaging arrangements can cause undesirable consequences. For example, the cables can retain kink or bend memory after being dispensed from the spool due to the cables' having been tightly wound around the spool for storage for an extended period of time. Such kink or bend memory can inhibit or prevent the cables from tending naturally toward a straight configuration when being installed and post-installation, which can cause unwanted stress on optical connections and increase tangling of cables installed at the same equipment. In some cases, the winding of the cables can cause undesirable twisting of the cables around their longitudinal axes beyond the minimum bend radii of the fibers, which can cause a reduction in performance or complete failure of the cable. In addition, manufacturing the spool or reel and mounting the spool or reel within a container can be a time consuming and costly procedure that requires several parts, often of different materials (e.g., cardboard, plastic, metal) that must be disposed of in different ways, increasing packaging cost causing inefficiencies in packaging manufacturing as well as for cable installers. In addition, the spool configuration can leave a large volume of unused space between the spool and the interior surfaces of the container (e.g., a box) used to hold and ship the spool. Such volume must be generally filled with protective shipping material, such as foam or rubber to protect the spool and the cables during shipping and handling of the container, generating an additional source of material cost, inefficient use of the interior volume of the container (which increases the shipping cost per cable), and further inefficiencies in disposal of the disparate packaging materials.

Containers and dispensers in accordance with the present disclosure can minimize or eliminate one or more of the foregoing drawbacks of spooled or reeled cables.

Reference will now be made to the drawings. The embodiments depicted in the drawings relate to packaging and dispensing of fiber optic jumper cables having connectorized ends. The cables are wound along their longitudinal axis and bagged in a series of bags, e.g., plastic bags. The bags form a continuous, foldable strip. The principles of the present disclosure are not limited to cables or bags, however.

Rather, principles of the present disclosure can be applied to any items supported by any continuous strip of a substrate that can be folded in the alternating folding pattern described herein. Another non-limiting example of such items is copper wire jumper cables or patch cords or other electrical wires or cables used to make electrical connections between different pieces of equipment.

Referring to FIG. 1, a dispenser 10 includes a container 12. The container 12 can be, e.g., a box, such as a cardboard box. The container 12 can be made from any suitable packaging material, such as cardboard, paperboard, rigid plastic, polystyrene, and the like. The container can be any suitable shape, such as a cube or other rectangular prism. In the example shown, the container 12 is a 12 inch cube made from cardboard panels.

The container 12 is shown in an upright position resting on a horizontal surface 14. A vertical axis 16 is perpendicular to the horizontal surface 14. The force of gravity (or gravity force) acts in the direction of the arrow 18, parallel to the vertical axis 16 and perpendicular to the horizontal surface 14. The container 12 is shown in a closed configuration. The container 12 includes a horizontal top panel 20, a horizontal bottom panel 22 resting on the surface 14, and four vertical side panels 24, 26, 28, 30 extending vertically from the bottom panel 22 to the top panel. Optionally, one or more of the panels 20, 22, 24, 26, 28, 30 includes a plurality of panels that together form a complete side of the rectangular prism defined by the container 12.

The panel 26 defines a dispensing slot 32. In the closed configuration of the container 12 shown in FIG. 1, the dispensing slot 32 is covered by a cover 34. The slot 32 faces horizontally, such that the opening (when uncovered) defined by the slot faces horizontally. The cover 34 is a removable cover of the slot. For example, the cover 34 can be attached to the panel 26 by one or more perforated edges. For example, one or more of the edges 36, 38, 40, 42 can be perforated and the cover 34 can be cut or punched out at the perforations to uncover the slot 32. In some examples, the bottom edge 36 is not perforated, and the edges 38, 40 and 42 are perforated, such that the cover 34 can be a flap that remains attached to the panel 26 at the edge 36 when the slot 32 is uncovered. The slot 32 is uncovered in order to dispense items from inside the container 12 to outside the container 12 through the slot 32.

The slot 32 extends vertically along the vertical dimension D2 from a bottom edge 36 of the slot 32 to a top edge 38 of the slot 32, and horizontally along an elongate dimension D1 of the slot from a first side 40 of the slot to a second side 42 of the slot.

The container 12 has a vertical dimension D3.

As used herein, terms such as above, below, top and bottom refer to relative vertical positions when the dispenser container is in an upright position.

In some examples, to provide for controlled regulatable dispensing, a maximum vertical dimension D2 of the slot 32 is shorter than one half, or shorter than one third, or shorter than one fifth, or shorter than one tenth of the maximum vertical dimension D3 of the container 12.

Figure 2:
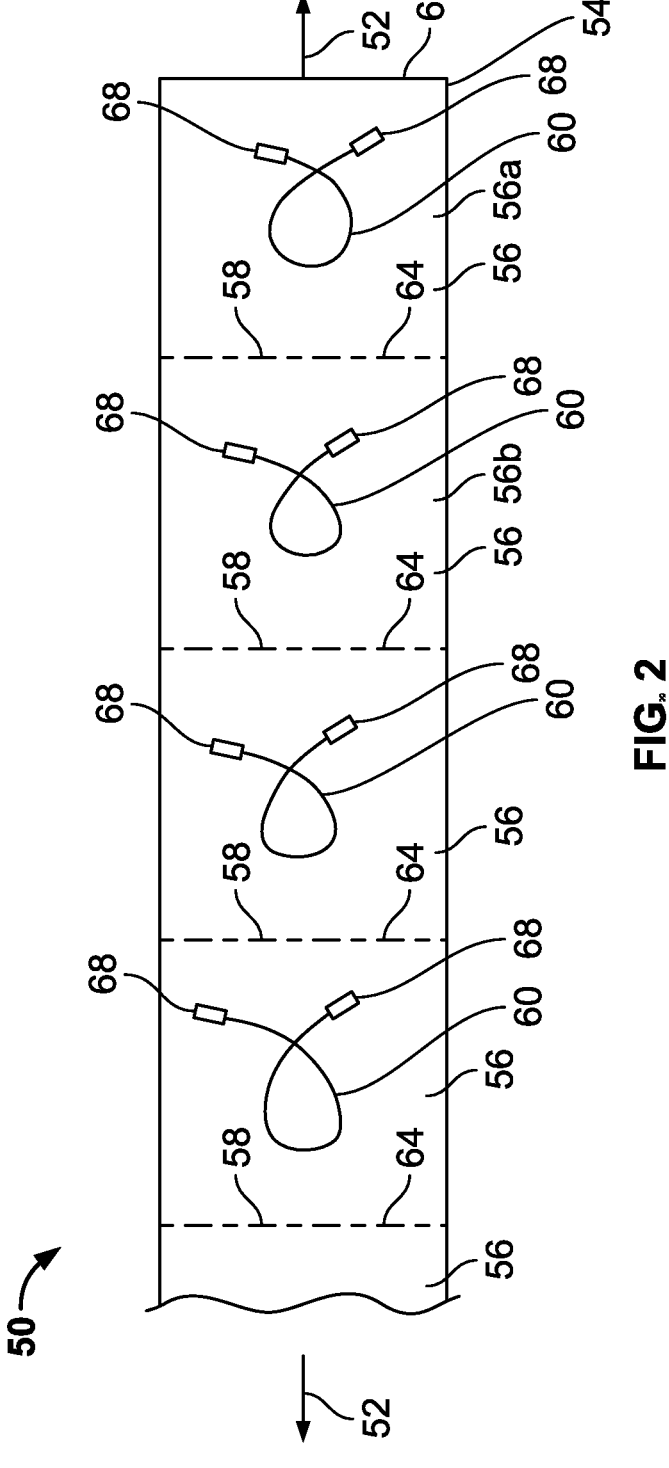
FIG. 2 is a schematic representation of a foldable strip of a substrate defining holders adjoining at fold lines and supporting bend resistant items.

FIG. 2 is a schematic representation of a foldable strip 50 of a substrate 54 defining holders 56 adjoining at fold lines 58 and supporting bend resistant items 60. The substrate 54 extends from a dispensing end 62 along a longitudinal strip axis 62.

The fold lines 58 are perpendicular to the strip axis 62. The fold lines 58 are parallel to one another. The fold lines 58 can, but need not, include a structure or feature to facilitate folding the substrate at the fold line and/or to favor or bias folding in a particular direction over another direction at the fold line. Such features or structures can include, for example, creases, indents, grooves, ribs, seams and so forth. In some examples, the fold lines are perforated. The perforations 64 can facilitate folding at the fold lines 58 and also facilitate tearing at the fold lines to remove one or more dispensed holders 56 from the strip 50.

The substrate 54 can be a relatively thin sheet of material such as paper, plastic, cardboard, etc. The substrate 54 can be made from a pliable material to facilitate folding. Each holder 56 supports one or more bend resistant items. The bend resistant items 60 can provide weight and structure to the substrate 54 on opposing sides of each fold line 58, which can facilitate the formation and stability of the alternating folding pattern of the substrate 54 described below.

In the depicted example, each holder 56 is a bag, e.g., a plastic bag, holding an item 60. Each holder or bag 56 has a leading end and a trailing end. Adjacent holders in the strip adjoin at the fold line 48 therebetween. For example, the fold line 58 between the holder 56a and the holder 56b is the trailing end of the holder 56a and the leading end of the holder 56b. Adjoining bags can be, but need not be, closed off from each other. For example, a seal (e.g., a heat seal) can be formed on the substrate 54 on either side of each fold line 58 along the axis 52. In an example embodiment, rather than bags, each item 60 is supported by its corresponding holder with a coupler, such as a twist tie, a zip tie, a clip, a fastener, etc. For example, a cable can be supported by a cardboard holder with a twist tie inserted through holes in the cardboard and around the cable.

The items 60 can be any item or product for which it is desirable to package a plurality of the item in a dispensing container. In the example depicted, each item 60 is one or more optical fiber jumper cables, each jumper cable including a jacket surrounding at least one optical fiber extending along a longitudinal axis of the cable. The optical fiber is connectorized at both ends with optical fiber connectors 68. The connectors 68 can be any desired form factor, e.g., LC, SC, MPO, etc. The connectors 68 can be single connectors, duplex connectors, or another configuration.

The holders 56 can include indicia indicating a number of remaining holders or a number of deployed holders in the strip. For example, the holders 56 can be numbered sequentially along the strip and/or indicate the number of holders remaining on the strip, thereby facilitating inventory management.

Figure 3:
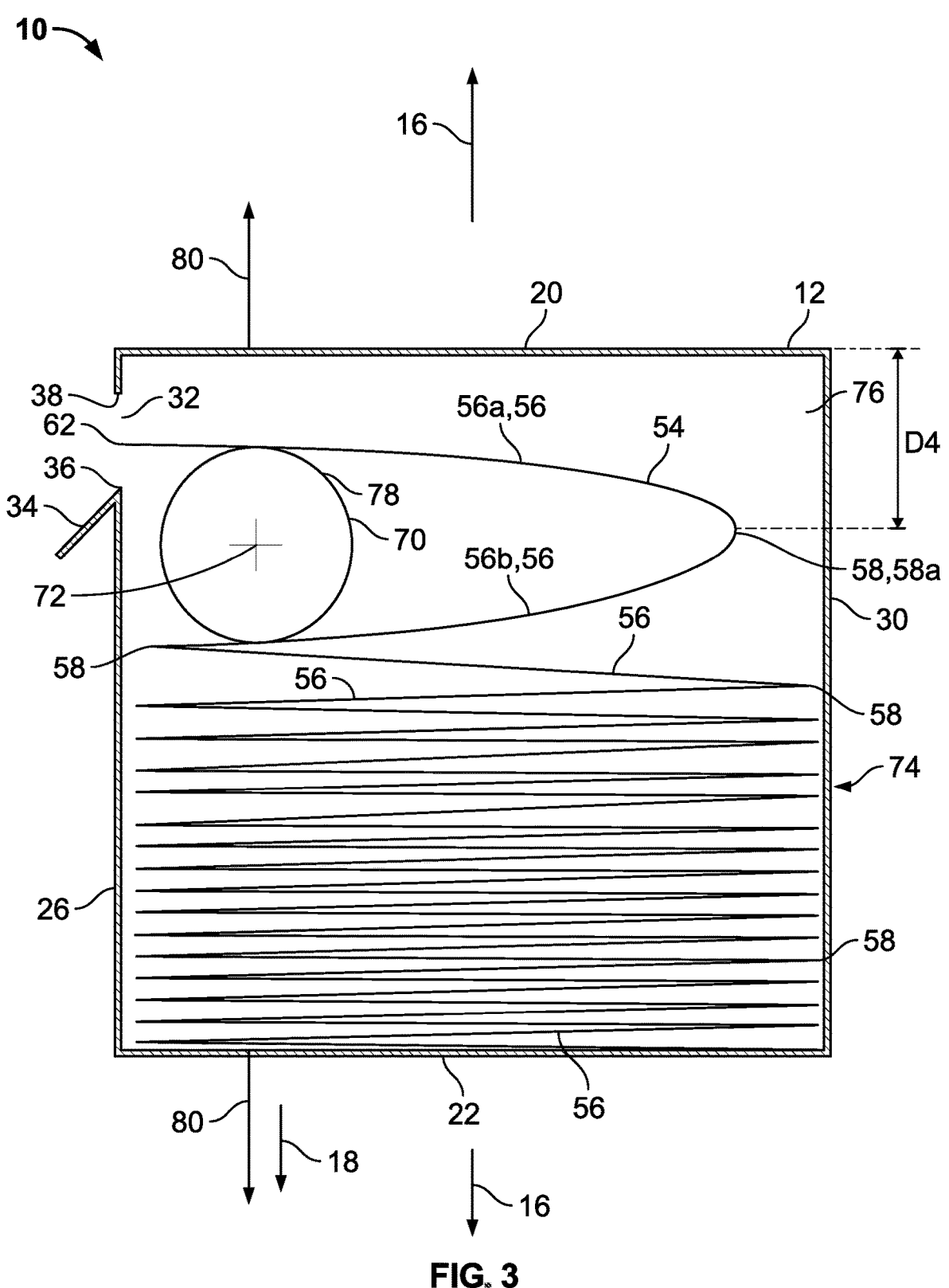
FIG. 3 is a schematic, side view of an interior of the container of FIG. 1, with a dispensing slot of the container being in an uncovered configuration and the foldable strip of FIG. 2 being in a dispensing configuration being arranged in a vertical stack of the holders within the container.

FIG. 3 is a schematic, side view of an interior of the container 12 of FIG. 1, with the horizontally facing dispensing slot 32 being in an uncovered configuration and the foldable strip 54 of FIG. 2 being in a dispensing configuration and being arranged in a vertical stack 74 of the holders 56 within the storage volume 76 defined by the panels of the container 12.

The cover 34 remains attached to the container 12 at the bottom edge of the slot 32, thereby forming a flap.

The holders 56 of the strip 54 support bend sensitive items, as described herein. The strip 54 in the vertical stack 74 of holders 56 is folded along the fold lines 58 in an alternating fold pattern as shown, with adjacent folds being positioned at opposite horizontal sides to each other within the container, such that the profile of the stack 74 shown in FIG. 3 includes a repeated Z-like pattern, or accordion-like pattern, of the holders 56. The fold pattern allows the items supported by the holders to lie substantially horizontally within the container 12, without being wound around a spool or reel. In addition, the fold pattern can facilitate controlled, regulatable dispensing of holders through the slot.

The holder 56a is the uppermost of the holders 56 in the stack 74. There is a fold line 58a at the junction between the uppermost holder 56a and the adjacent holder 56b of the strip 54.

Figure 4:
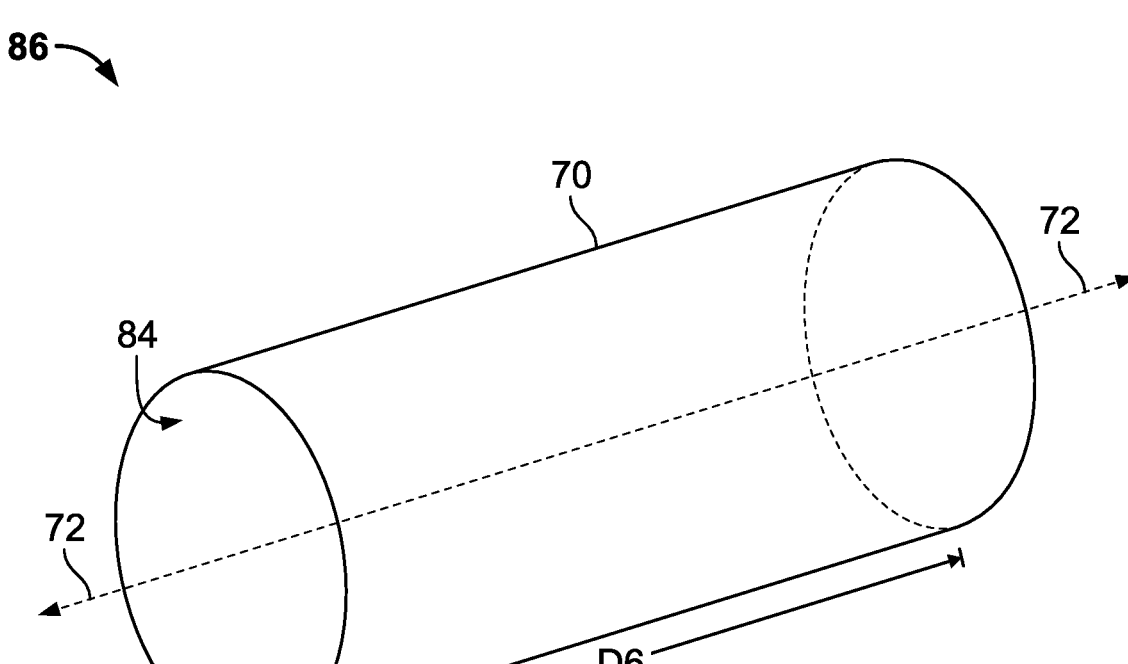
FIG. 4 is a perspective view of the dispensing guide of the dispenser of the container of FIG. 3.
Figure 5:
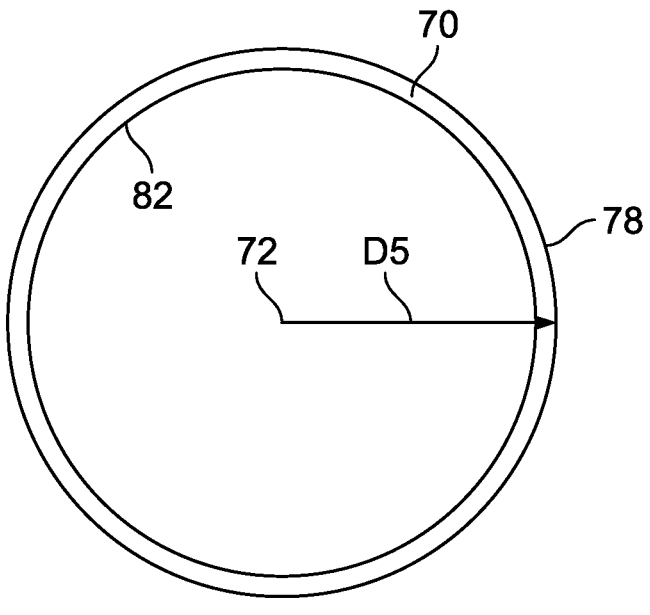
FIG. 5 is an end view of the dispensing guide of FIG. 4.

Referring to FIGS. 3-5, the dispenser 10 includes a dispensing guide 70 having a curved outer surface 78. The dispensing guide 70 is positioned within the storage volume 76 vertically below the top edge 38 of the slot 32 and vertically above all of the holders 56 except for the uppermost holder 56a. A portion of the top of the holder 56a abuts the covered outer surface 78 of the dispensing guide 70, and the dispensing guide 70 rests atop a portion of the stack 74.

The dispensing guide 70 defines a longitudinal axis 72 of the dispensing guide (into and out of the page in FIG. 3) that is substantially parallel to the elongate dimension of the slot 32.

The dispensing guide 70 is not attached to any portion of the container 12 and is allowed to vertically float within the storage volume 76. Thus, the dispensing guide 70 is arranged to move downward in the storage volume under a gravity force in the direction 18 as the holders 56 are dispensed through the slot 32.

In the example shown, the dispensing guide 70 is a rotatable body and the axis 72 of the dispensing guide is a rotation axis of the rotatable body. The rotatable body can rotate about the axis 72 as holders 56 are dispensed. Friction between the holders 56 and the rotatable body as the strip 54 is pulled over the rotatable body can cause the rotatable body to rotate about the axis 72, which can also aid in dispensing of holders through the slot in a controlled, regulatable manner.

In some examples, the dispensing guide is mounted in one or more guides (e.g., grooves tracks or other structures, such as the schematically shown guides 99 in FIG. 1) that retain the dispensing guide within the same vertical plane 80, extending into and out of the page in FIG. 3, as the dispensing guide moves downward in the storage volume. Because the dispensing guide vertically floats and moves downward as the stack shrinks vertically, it continues to rest on the stack, which can stabilize the alternating folding pattern and prevent it from unravelling.

In some examples, the panels of the container 12 and the dispensing guide 70 are manufactured at least partially from the same material. In some examples, such material can be cardboard or the like.

In the example shown, the dispensing guide 70 is a hollow tube. The tube includes the outer cylindrical surface 78 and an inner surface 82. Opposite ends 84 and 86 of the tube are open. In other examples, the dispensing guide can be a solid cylindrical body, or can include one or more features that increase the weight of the dispensing guide, such as an increased wall thickness, closed ends, etc. In some examples, the dispensing guide is not a tube or cylinder. For example, the dispensing guide could have the shape of a partial cylinder.

The dispensing guide 70 has a radius D5 extending from, and perpendicularly to, the longitudinal axis 72 of the dispensing guide 70 to the curved outer surface 78. In some examples, radius D5 is greater than or equal to a minimum bend radius of the items supported on the strip. For example, if items supported on the strip include optical fibers (e.g., in the case of fiber optic cables) the radius D5 is greater than or equal to the minimum bend radius of the fibers. In some examples, the radius D5 is greater than one inch. In some examples, the radius is at least 1.5 inches.

In some examples, the radius D5 is such that a smallest vertical distance D4 between the uppermost fold line 58a of the fold lines 58 of the stack of holders and the top panel is minimized (e.g., less than about five inches, or less than about two inches) in order to minimize unused head space in the container 12 for shipping and handling of the container 12. Optionally, empty head space that can be filled or partially filled with protective packing material (e.g., foam). In some examples, the packing material can be secured to one or more panels of the container 12.

In some examples, to improve dispensing characteristics and/or minimize free headspace in the container 12, a maximum width dimension D6 of the dispensing guide 70 parallel to the longitudinal axis 72 is greater than one half, or greater than three fourths, or greater than four fifths, or greater than nine tenths of a maximum width dimension D7 (FIG. 1) of the corresponding panels of the container 12.

In some examples, the slot 32 is centered horizontally to the dimension D7 (FIG. 1) and not centered vertically to the dimension D3.

In some examples, prior to uncovering the slot 32 to convert the dispenser 10 to the dispensing configuration, the uppermost holder 56a in the stack is attached, e.g., with a fastener or adhesive, to the cover 34, which can facilitate initial deployment of the holders through the slot by juxtaposing the leading edge of the strip at the slot. In other examples, the uppermost holder 56a can be attached to another part of the container 12 during storage and shipment to facilitate transitioning of the container 12 to the dispensing configuration by making it easier to locate the uppermost holder.

Figure 6:
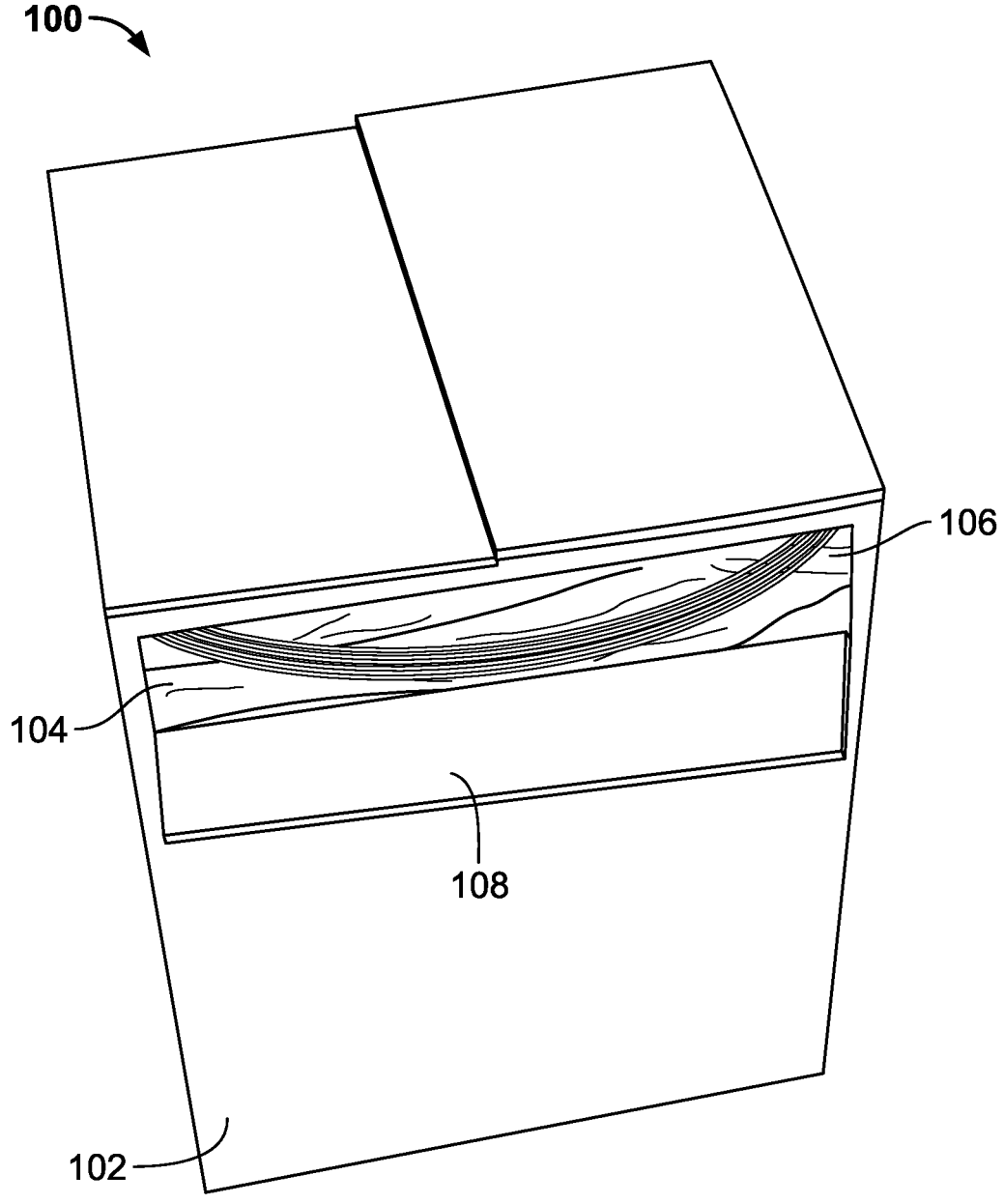
FIG. 6 is a perspective view of an example dispenser according to the present disclosure, the dispenser containing bend resistant items, the dispenser being in a first dispensing configuration.

FIG. 6 is a perspective view of an example dispenser 100 according to the present disclosure, the dispenser 100 including a container 102 containing bend resistant items supported in a continuous strip of bags 104 folded in an alternating pattern as described above.

In FIG. 6, the dispenser 100 is in a first dispensing configuration, in which the dispensing slot 106 has been uncovered by the cover 108, which has formed a flap, and the uppermost bag has been detached from the cover 108.

Figure 7:
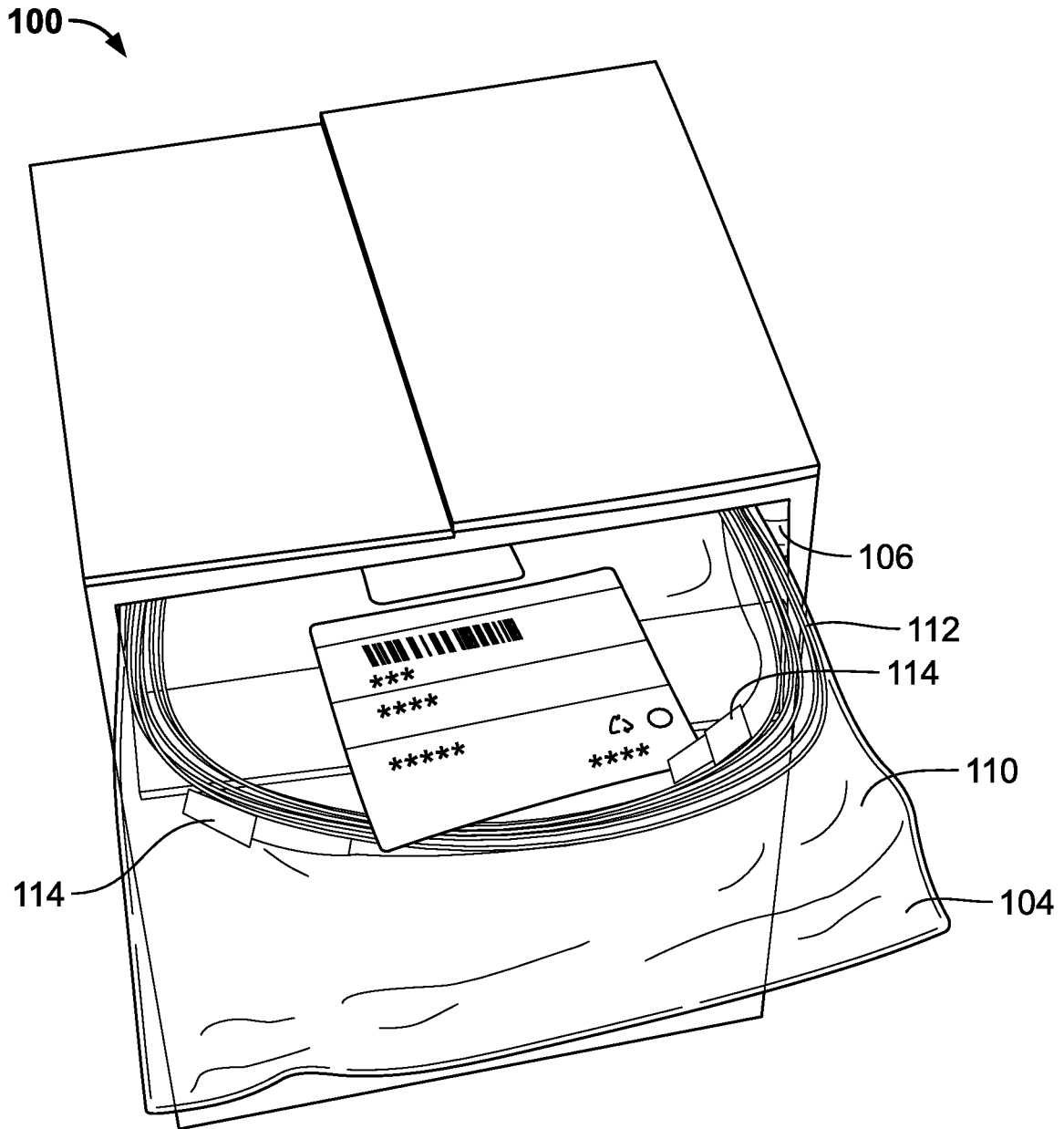
FIG. 7 is a perspective view of the dispenser of FIG. 6, the dispenser being in a second dispensing configuration.

In FIG. 7, the dispenser 100 is in a second dispensing configuration that is subsequent to the first dispensing configuration of FIG. 6. In FIG. 7, the uppermost bag 110 of the strip 104 has been grasped and pulled through the slot 106 over the dispensing guide. As shown, the bag 110 contains a connectorized optical jumper cable 112 with duplex connectors 114 at opposite ends of the cable 112.

Figure 8:
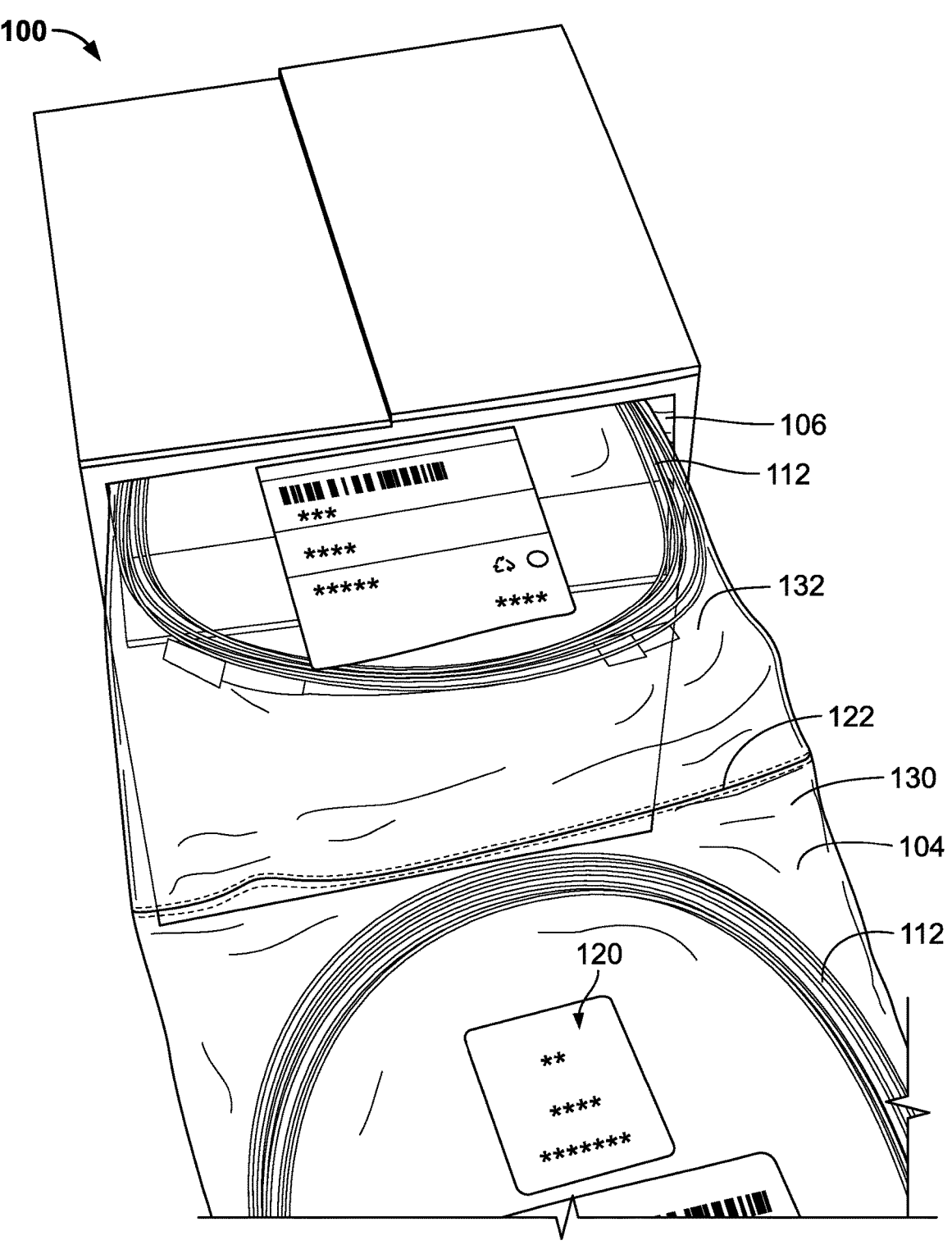
FIG. 8 is a perspective view of the dispenser of FIG. 6, the dispenser being in a third dispensing configuration.

In FIG. 8, the dispenser 100 is in a third dispensing configuration that is subsequent to the second dispensing configuration of FIG. 7. In FIG. 7, the strip 104 has been pulled further through the slot over the dispensing guide. Two bags 130, 132, each containing an optical fiber jumper cable 112, are shown. The bags 130, 132 are joined at a perforated fold line 122. The bags 130, 132 can be easily separated from each other by tearing along the perforated fold line 122. The bags include sequential indicia 120 indicating the number of bags remaining in the strip.

Figure 9:
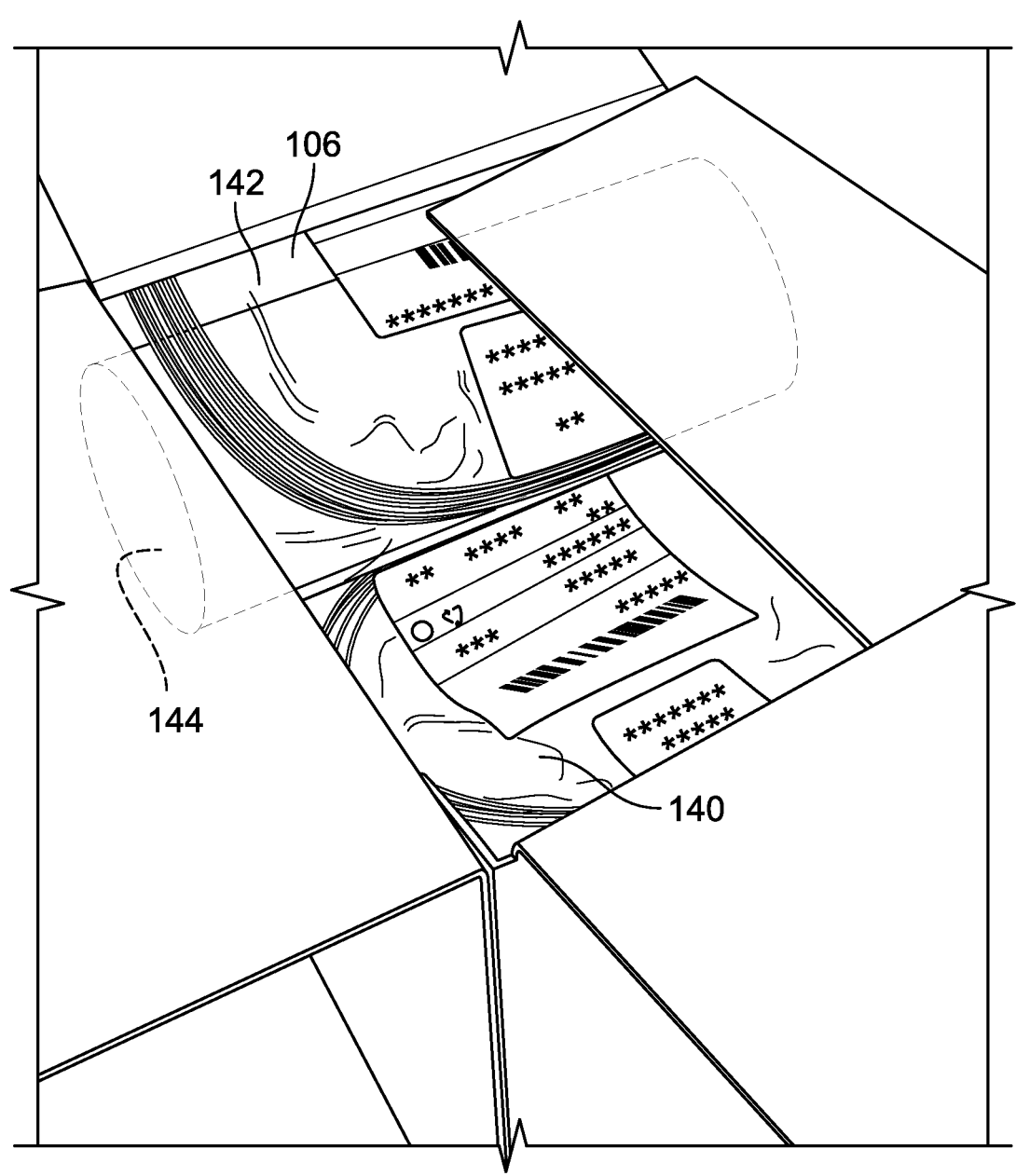
FIG. 9 shows an interior portion of the container of the dispenser of FIG. 6 when the dispenser is in a fourth dispensing configuration.

FIG. 9 shows an interior portion of the container of the dispenser 100 of FIG. 6 when the dispenser is in a fourth dispensing configuration subsequent to the third dispensing configuration of FIG. 8. The container holds a stack 140 of a continuous strip of bags containing cables. An uppermost bag 142 is being dispensed through the slot 106 by being dragged over a tubular dispensing guide 144, causing the dispensing guide 144 to rotate while vertically floating within the container.

Figure 10:
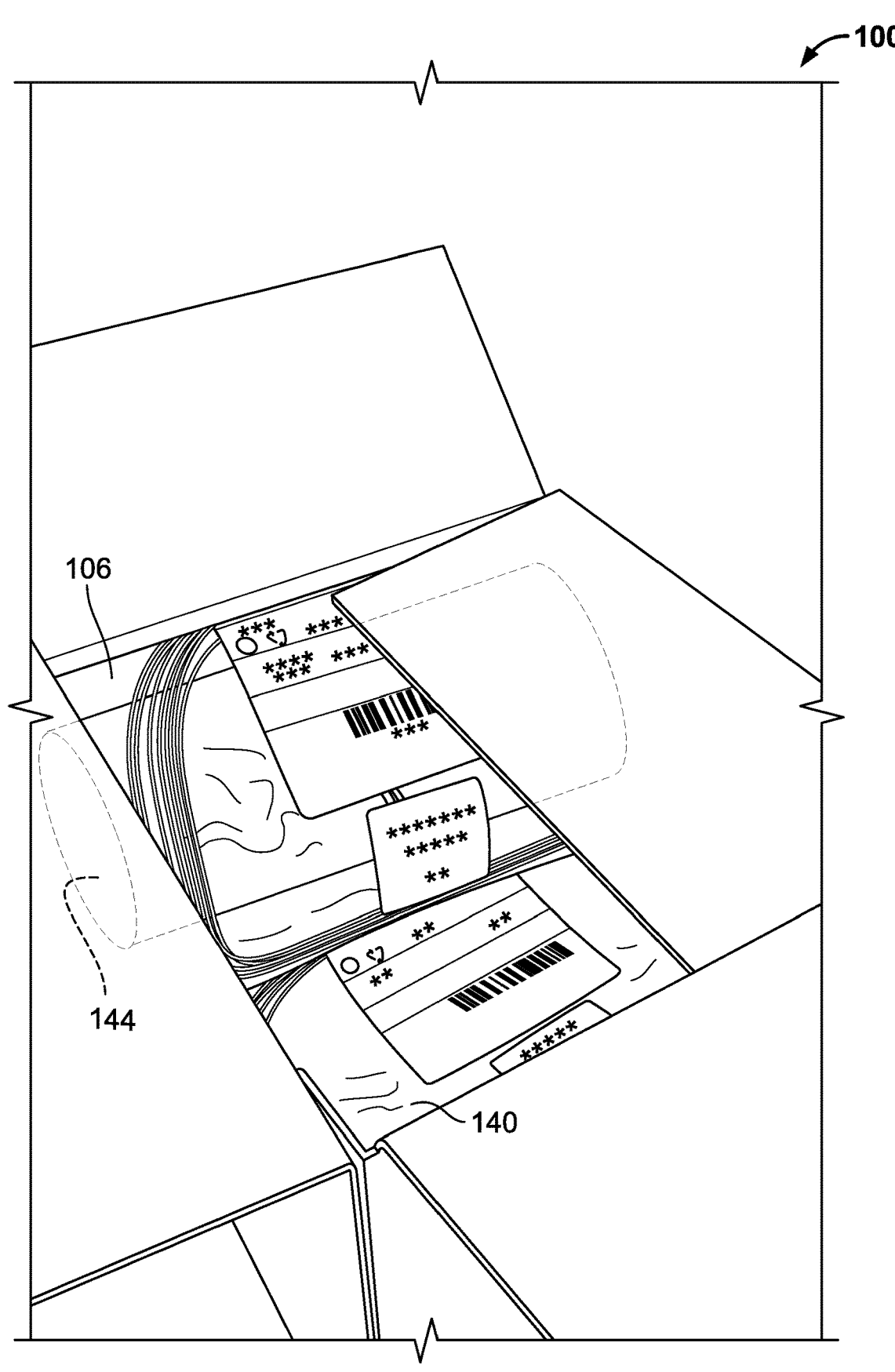
FIG. 10 shows an interior portion of the container of the dispenser of FIG. 6 when the dispenser is in a fifth dispensing configuration.

FIG. 10 shows an interior portion of the container of the dispenser of FIG. 6 when the dispenser is in a fifth dispensing configuration subsequent to the fourth dispensing configuration of FIG. 9. In FIG. 10, the stack 140 is shorter than in FIG. 9 because some of the bags have been dispensed through the slot 106 between the fourth configuration and the fifth configuration. In addition, because the dispensing guide 144 vertically floats, it has moved downward in the container between the fourth configuration and the firth configuration, due to the shrinking stack 140.

From the foregoing detailed description, it will be evident that modifications and variations can be made in the devices of the disclosure without departing from the spirit or scope of the invention.

What is claimed is:

1. A dispenser, comprising:

a continuous strip of a substrate defining holders each supporting a bend-sensitive item with adjacent holders of the holders adjoining each other at fold lines;

a container extending vertically from a horizontal bottom panel of the container to a horizontal top panel of the container and including a plurality of vertical side panels extending from the bottom panel to the top panel, the bottom panel and the side panels defining a storage volume, the container containing the continuous strip in a vertical stack of the holders in the storage volume, the holders in the vertical stack being folded at the fold lines in an alternating folding pattern, one of the side panels defining a covered or uncovered horizontally facing slot; and a dispensing guide having a curved outer surface and being positioned within the storage volume vertically below a top of the slot and vertically above at least all but one of the stack of holders, the dispensing guide defining a longitudinal axis of the dispensing guide that is substantially parallel to an elongate dimension of the slot, the dispensing guide being arranged to move downward in the storage volume under a gravity force as the holders are dispensed through the slot, wherein the bend-sensitive item is a fiber optic cable, wherein the dispensing guide has a radius extending from, and perpendicularly to, the longitudinal axis of the dispensing guide to the curved outer surface, the radius being greater than or equal to a minimum bend radius of an optical fiber of the fiber optic cable, and wherein the radius is at least 1.5 inches.

2. The dispenser of claim 1, wherein the holders are bags each containing the bend-sensitive item.

3. The dispenser of claim 2, wherein the slot is covered with a cover, and wherein an uppermost bag in the stack is attached to the cover.

4. The dispenser of claim 3, wherein there are perforations between the cover and the one of the side panels; and wherein the cover is a flap that remains attached to the container at one of a top edge or a bottom edge of the cover.

5. The dispenser of claim 1, wherein the holders are sheets and the bend-sensitive item is mounted to each of the sheets.

6. The dispenser of claim 1, wherein the dispensing guide is a rotatable body and the longitudinal axis defined by the dispensing guide is a rotation axis of the rotatable body.

7. The dispenser of claim 1, wherein the dispensing guide is mounted in one or more guides that retain the dispensing guide within a vertical plane as the dispensing guide moves downward in the storage volume.

8. The dispenser of claim 1, wherein the dispensing guide is not connected to the container.

9. The dispenser of claim 1, wherein the container and the dispensing guide comprise the same material.

10. The dispenser of claim 1, wherein the radius is such that a smallest vertical distance between an uppermost fold line of the fold lines and the top panel is less than about five inches.

11. The dispenser of claim 1, wherein each fold line is perforated.

12. The dispenser of claim 1, wherein a maximum vertical dimension of the slot is shorter than one tenth of a maximum vertical dimension of the container.

13. The dispenser of claim 1, wherein a maximum width dimension of the dispensing guide parallel to the longitudinal axis is greater than nine tenths of a maximum width dimension of the one of the panels of the container.

14. The dispenser of claim 1, wherein the dispensing guide is cylindrical.

15. The dispenser of claim 1, wherein the dispensing guide is a hollow tube.

16. The dispenser of claim 15, wherein opposite ends of the hollow tube are open.

17. The dispenser of claim 1, wherein the holders include indicia indicating a number of remaining holders in the continuous strip or a number of holders of the continuous strip that have been deployed from the container.

18. The dispenser of claim 1, wherein the dispensing guide is the only dispensing guide positioned within the storage volume.

19. A dispenser, comprising:

a continuous strip of bags each containing a bend-sensitive fiber optic cable with adjacent bags of the bags adjoining each other at perforated fold lines;

a container extending vertically from a horizontal bottom panel of the container to a horizontal top panel of the container and including a plurality of vertical side panels extending from the bottom panel to the top panel, the bottom panel and the side panels defining a storage volume, the container containing the strip of bags in a vertical stack of the bags within the storage volume, the bags in the vertical stack being folded at the fold lines in an alternating folding pattern, one of the side panels defining a covered or uncovered horizontally facing slot; and a rotatable body positioned within the storage volume vertically below a top of the slot and vertically above at least all but one of the stack of bags, the rotatable body defining a rotation axis that is substantially parallel to an elongate dimension of the slot, the rotatable body being arranged to move downward in the storage volume under a gravity force as the bags are dispensed through the slot, wherein the container and the rotatable body comprise the same material;

wherein the rotatable body has a radius extending from the rotation axis perpendicularly to the rotation axis to a curved outer surface of the rotatable body, the radius being greater than or equal to a minimum bend radius of an optical fiber of the bend-sensitive fiber optic cable, wherein the radius is at least 1.5 inches;

wherein a maximum vertical dimension of the slot is shorter than one tenth of a maximum vertical dimension of the container; and wherein an uppermost bag in the stack is attached to the container.

20. The dispenser of claim 19, wherein the rotatable body is a dispensing guide that is the only dispensing guide positioned within the storage volume.

* * * * *